United States Patent
Juel

[15] 3,676,535
[45] July 11, 1972

[54] METHOD AND APPARATUS FOR CONTROLLING ORIENTATION OF NEEDLE-LIKE CARBON PARTICLES IN EXTRUDED CARBON STOCK

[72] Inventor: Leslie H. Juel, 611 Sandlewood Drive, Lewiston, N.Y. 14092

[22] Filed: Nov. 7, 1969

[21] Appl. No.: 874,849

[52] U.S. Cl. ........................... 264/29, 18/14 V, 23/209.2, 25/11, 25/15, 25/17, 264/105, 264/108
[51] Int. Cl. ........................... B29f 3/04, C04b 35/54
[58] Field of Search ................ 264/108, 105, 29; 25/11–17; 23/209.2; 18/14 R, 14 V

[56] References Cited

UNITED STATES PATENTS

| | | | |
|---|---|---|---|
| 2,280,022 | 4/1942 | Banigan et al. | 264/108 |
| 2,332,829 | 10/1943 | Parsons et al. | 264/108 |
| 2,612,655 | 10/1952 | Mathues | 25/17 |
| 2,770,836 | 11/1956 | Hankey | 25/17 |
| 3,196,486 | 7/1965 | Shesler et al. | 264/176 |
| 3,350,485 | 10/1967 | Shesler et al. | 264/105 |

OTHER PUBLICATIONS

" Research and Development on Advanced Graphite Materials," Volume XLII— Summary Technical Report, WADD TR 61– 72, Wright-Patterson Air Force Base, Ohio, August 1963, at 76 and 167— 173

*Primary Examiner*—Julius Frome
*Assistant Examiner*—John H. Miller
*Attorney*—Wallace F. Neyerlin

[57] ABSTRACT

A means and method are provided for extruding compositions, particularly for extruding mixes of carbon and/or graphite particles and carbonizable binder, whereby the composition is subjected to greater working than normally encountered in conventional extrusion practices. This extrusion technique results in the elimination of or minimization of the effects of batch interfaces and in better consolidation of the mix. The means and method can additionally be employed to control the orientation of acicular particles in a composition during the extrusion thereof so as to control the properties of the extruded product.

In all cases, the extrusion die's internal configuration is defined by at least three "working" sections, (which may be interrupted by one or more sections of substantially constant cross section, e.g. cylindrical sections), consisting of a first converging section, then a diverging section, and then a second converging section. When employed in the extrusion of a carbonaceous mix containing needle-like carbon particles, dies of the present invention of appropriate design can be used to produce stock which after baking and graphitizing is characterized by having a transverse to longitudinal average coefficient of thermal expansion (CTE) ratio considerably less than that characteristic of corresponding stock in which the particles are all axially aligned.

19 Claims, 2 Drawing Figures

INVENTOR.
LESLIE H. JUEL

3,676,535

METHOD AND APPARATUS FOR CONTROLLING ORIENTATION OF NEEDLE-LIKE CARBON PARTICLES IN EXTRUDED CARBON STOCK

BACKGROUND OF THE INVENTION

1. Field of the Invention

This invention relates broadly to a method and apparatus for subjecting an extrudable material or composition to a high degree of working while being extruded. It also relates broadly to a method for controlling the orientation of acicular particles in an extrudable material or composition so as to control the properties of the extruded product. More particularly this invention relates to a process for the production and manufacture of carbon and graphite products and to a special means or apparatus particularly useful in carrying out one of the steps of said production and manufacture, viz. the extrusion step.

2. Description of the Prior Art

In the conventional or normal type of extrusion of green carbon bodies such as electrodes from a mixture of carbon and/or graphite particles and a binder, such as pitch, the mix is subjected to essentially continuous reduction in a converging die or die system connected directly to the mud cylinder of the press. In the production of certain graphite electrodes for steel furnaces, and other graphite products, such as anodes for brine electrolysis and graphite for nuclear reactors, a high percentage of the carbon and/or graphite particles employed in the mixture are frequently acicular or needle-like in shape. When extruding in a conventional die system, the reduction ratio, that is, the ratio of the cross-sectional area of the mud chamber to the cross sectional area of the product to be extruded is frequently so great that virtually all of the needle-like particles end up aligned with their axes parallel to that of the product. This leads to a graphite product which has a relatively high coefficient of thermal expansion (CTE) in the direction(s) perpendicular to, as compared to parallel with, the direction of extrusion and consequently to a graphite product which may not give optimum performance in the particular environment in which the graphite product is to be used, for example graphite electrodes in service on a modern ultra-high powered electric steel furnace where the thermal shock and thermal stress conditions are particularly severe.

To control the alignment or orientation of needle-like particles to the degree that is required or desired in the final graphite electrode when using a conventional batch type extrusion press coupled with a single converging die, the degree of reduction during extrusion, or, in other words, the ratio of the cross-sectional area of the mud cylinder of the press to the cross-sectional area of the product would have to be so small that, particularly in the case of the large-diameter electrodes, only one plus a small-fraction electrode could be extruded from a given charge to the press. This would mean that the extrusion operation would have to be interrupted much more frequently than when employing a converging die with a high degree of reduction and that at least every other electrode extruded would contain a so-called batch interface generated by the mating of two successive batches or charges to the press. Such interfaces have frequently caused problems in processing, especially when the degree of reduction during extrusion is small, since they tend to persist throughout subsequent processing and represent potential regions of weakness or stress concentration.

A conventional extrusion press with a large mud cylinder, because of its large cross-sectional area as compared to the cross-sectional area of the electrode to be extruded, permits the extrusion of more than one electrode from a given charge and thus minimizes problems connected with batch interfaces between charges. This, however, suffers the disadvantage of restricting the degree of freedom over the control of the grain orientation in the extruded product since a high degree of reduction leads to substantially complete or axial alignment of the particles.

Also, many conventional presses are of the tilting type and have an associated vertical tamping apparatus. A tamping pressure higher than the extrusion pressure is beneficial in the attainment of a high density in the final product. In such cases, a separate mechanism is required for high pressure tamping in order to confine the mix, otherwise, the tamping is limited to the normal extrusion pressure of the single die system, since, if this pressure is exceeded when the press cylinder is in the vertical position required for charging and tamping, the material would begin to extrude.

Previous attempts have been made to devise extrusion methods and apparatuses which will accomplish some of the goals and objectives of the present invention such as, controlling the transverse to parallel or longitudinal (T/L) ratio of the CTE of the bodies produced, and U.S. Pat. No. 3,350,485 is illustrative of one type of such approach or development. Appendix VI (pages 167–172) of "Technical Documentary Report No. WADD TR61-72, Vol. XLII" describes another related development. However, the techniques and solutions devised in these references are substantially different from the methods and apparatuses devised and employed in the present invention.

SUMMARY OF THE INVENTION

A broad object of this invention is to provide a means and method for subjecting an extrudable material to a high degree of working while being extruded. Another object is to provide a means and method for extruding mixes of carbon and/or graphite particles and binder whereby the mix is subjected to greater working and better consolidation than normally encountered in conventional extrusion practices and whereby the structure of carbonaceous (i.e. baked carbon or graphite) stock prepared from the mix is improved. Another object is to permit the use of an increased pressure in extruding such a carbon mixture as compared to that used with a conventional die system. Another object is to provide a means and method for controlling the orientation of acicular particles in a composition during the extrusion thereof so as to control the properties of the extruded product.

A further and more specific object of this invention is to provide a means and method for controlling the orientation of the coke and/or graphite particles and binder in a carbonaceous mix during extrusion so as to effect the desired properties in the final product. This latter objective of the present invention is particularly applicable to the processing of coke and/or graphite particles of high quality, i.e. to particles a high percentage of which contain or possess a needle-like structure.

Another object is to accomplish the foregoing while still employing a conventional capacity mud chamber and also, if desired, while still employing a tilting type press and associated tamping apparatus.

It is a finding of this invention that when processing such a carbonaceous mix containing needle-like coke and/or graphite particles and a carbonizable binder in a generally longitudinal direction through a forming die of the present invention, the alignment of the particles can be substantially altered such that the ratio of the transverse to the longitudinal average coefficient of thermal expansion of the extruded stock, after baking and graphitizing, is reduced from that characteristic of axial alignment. Graphite bodies with such reduced (T/L) CTE ratios or controlled thermal expansion properties may be advantageous for nuclear reactor applications, for reasons discussed in the aforesaid U. S. Pat. No. 3,350,485; they may also be advantageous when used as thermic electrodes in electric steel furnaces and in other applications.

It is an additional finding of the present invention that carbonaceous stock of generally improved structure and typically of higher strength, stemming primarily from the increased working of the mix, and the higher pressures that can be used in extruding it, can be produced when using process techniques and apparatus within the broad scope of the present invention, even if the die employed is not so specifically designed as to bring about an alteration in the CTE characteristics and even when little or none of the coke and/or graphite particles employed in the mix being processed is of the "needle-like" type.

The dies employed to accomplish any of the aforedescribed goals of the present invention are all characterized by possessing at least three "working" sections (which sections are also preferably coaxially aligned) comprising a first converging section, then a diverging section and then a second converging section. By a "working" section is meant one that is of varying cross-section throughout its length in contrast to one of substantially constant cross-sectional area. The material passing through such a working section experiences external and internal forces differing substantially in magnitude and direction compared to a material passing through a section of substantially constant cross-section.

Preferably, the reduction ratios of the cross-sectional areas in each of the converging sections are between about 1.25 to 1 and about 15 to 1, and the expansion ratio of the cross-sectional areas in the diverging section is between about 1 to 1.25 and about 1 to 15. In the production of cylindrical products, the sections are each also preferably characterized by possessing smooth interior contours and are also so shaped and designed that a cross-section at any location in each of the sections is circular. (As will be discussed hereinafter, however, the stock being extruded need not always possess such a circular cross-section at any location.) There may be a region or section of substantially constant cross-section (e.g. a substantially cylindrical section) located before or after one or more of the working sections although this requirement will depend upon the particular die contour within each section and also the particular specific goal being sought at the time.

The dimensions and contours of the working sections of the die are so regulated as to develop the desired improved structure and physical properties. When the mix employed involves particles of the "needle-like" type, these particles are substantially aligned with their axes parallel to the axis of the extrusion cylinder upon exiting from the first converging section, which is attached directly to the straight cylindrical barrel or mud pot of the extrusion press. From this section, the material enters the diverging portion or "bubble" section of the die system where the individual grains or needlelike particles are forced to take a position such that their axes tend to become oriented in a plane that is perpendicular to the axis or direction of extrusion. The material then moves into the second converging section where the final orientation of the grains or needlelike particles is brought about so that on the average the angle of inclination that the axes of these needlelike particles make with the axis of extrusion will be such that the desired CTE characteristics in the final product are achieved. If a reduction in the T/L CTE ratio is desired then it is necessary that the reduction ratio of the cross-sectional areas of the stock passing through the second converging section be less than the reduction ratio in the first converging section. Preferably in such cases the cross-sectional area reduction ratio in the first converging section will be between about 1.25 and about 12 times as great as the cross-sectional area reduction ratio in the second converging section.

The cross-sectional area to which the first section converges will in general be equal to or less than that at the exit end of the entire die system, so that a tamping pressure higher than that which would normally be used when extruding directly through a simple die system having a single converging section can be employed. The cross-sectional area at the major diameter of the diverging or "bubble" section is at least about 1.2 times the cross-sectional area of the product at the exit end of the final converging section in order to assure proper functioning of the die. The contours of the internal surfaces of the various sections of the die system are variable but generally consist of smooth surfaces, continuously decreasing or increasing gradually, depending upon whether the converging or diverging section is involved. Most frequently the cross-sectional shape of the material being extruded at any given location will be circular. However, in some cases it may be desirable that the converging and/or diverging sections possess or define other geometrical configurations, such as to define rectangular, hexagonal or annular cross-sectional shapes.

The over-all length of the die system is limited mainly by practical considerations although the design of the diverging or bubble section and the rate at which the material being extruded is forced or passes therethrough should be such that the material exiting from the first converging section does not "rifle" or "shot-gun" through the bubble thereby negating its function.

No baffle plates nor any other types of obstruction are placed within the die system, except perhaps a mandrel in case a material of annular cross-section is to be extruded, and the increased working of the mix and/or the control of the alignment of the particles (and consequently the achievement of the desired properties) are attained substantially entirely by means of the forces applied to the mix by the internal configuration of the die system employed and of the various sections thereof.

BRIEF DESCRIPTION OF THE DRAWINGS

A representative die of preferred construction is shown in cross-section in FIG. 1. This figure also shows the internal contours of the various essential sections of the die, as well as auxiliary apparatus and/or sections used with the die.

FIG. 2 however, is a schematic rather than a cross-sectional view.

DETAILED DESCRIPTION OF THE DRAWINGS & OF THE PREFERRED EMBODIMENTS

Figure 1:
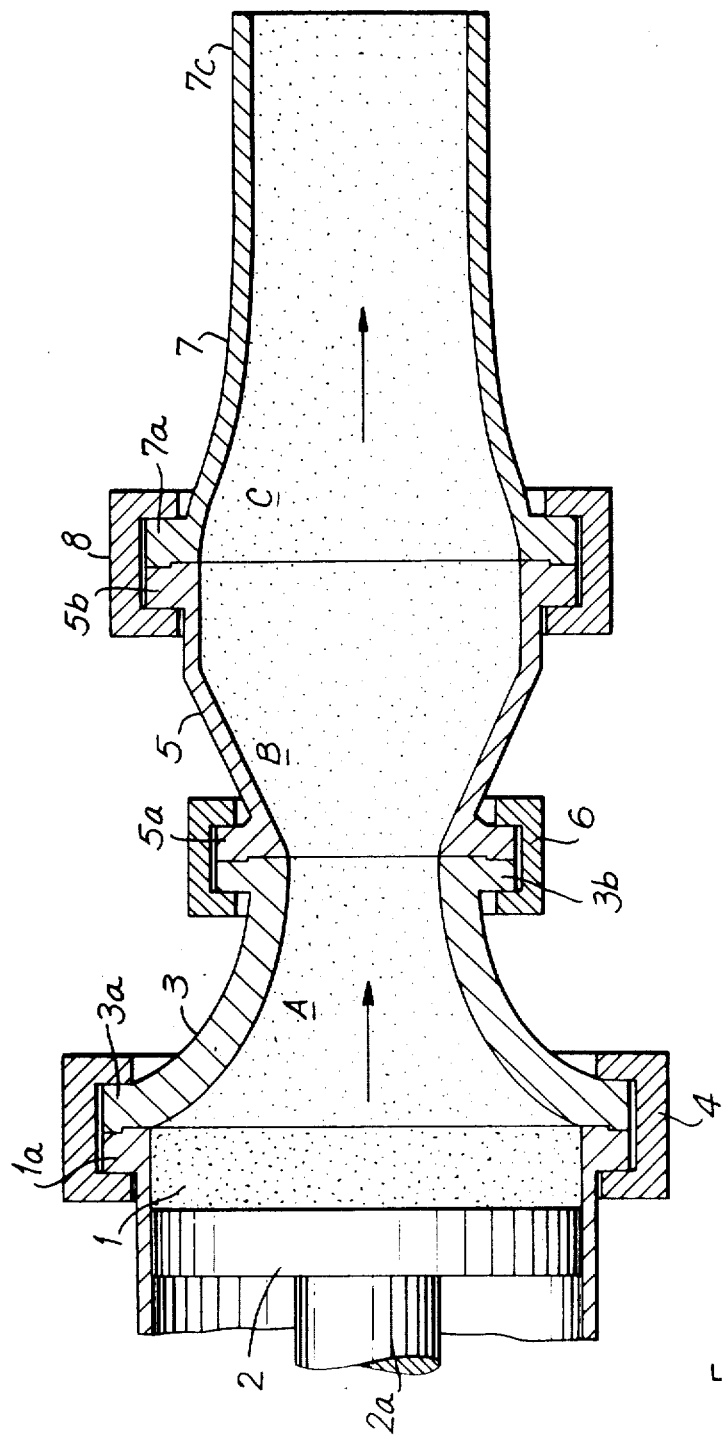

In FIG. 1 the first converging section is shown at A, the diverging or bubble section at B, and the second converging section at C. It will be noted that in section A, the die contour is continuously diminishing and that the cross-section at any point along its length defines a circle (although the cross-sectional area is changing). The same feature applies also to sections B and C except that in section B, the contour is frustoconical and there is gradual expansion instead of reduction.

It should be noted that the sections described as A, B and C refer more to the contours of the die sections rather than the physical parts of the die system, these latter now being described in connection with the reference numerals of the drawing.

The mix to be extruded is charged into a cylindrical chamber or "mud cylinder" 1 of a conventional hydraulic or mechanical press. The mix is forced through section A by advancing ramhead 2, which is connected to the mechanically or hydraulically actuated ram 2a. (Such a means for forcing the mix into the die sections of the extrusion dies of the present invention is greatly preferred over other means, such as a screw-type extruder.) It will be appreciated that, as illustrated, only a portion of the mud cylinder is shown and that ram 2a and ramhead 2 have neared the end of their stroke in the direction toward converging section A. The press terminates in a flange 1a which is coupled with flange 3a of converging member 3 by means of ring clamp 4. Flange 3b of member 3 is coupled to flange 5a at the inlet end of member 5 by means of ring clamp 6. Member 5, which defines section B, also defines a section of substantially constant cross-sectional area, e. g. cylindrical, at its exit end. Flange 5b, at the exit end of member 5, is coupled to flange 7a, at the inlet end of member 7, by means of ring clamp 8. Member 7 defines section C which converges from its inlet end to a section 7c of substantially constant cross-section, e. g. cylindrical, at its exit end.

It should, of course, be appreciated that the manner in which the sections are joined together in FIG. 1 may be varied, as may also the number of members and clamps employed in order to obtain the desired configuration of the entire assembly, the particular way the members are joined and shown in FIG. 1 being illustrative only.

Figure 2:
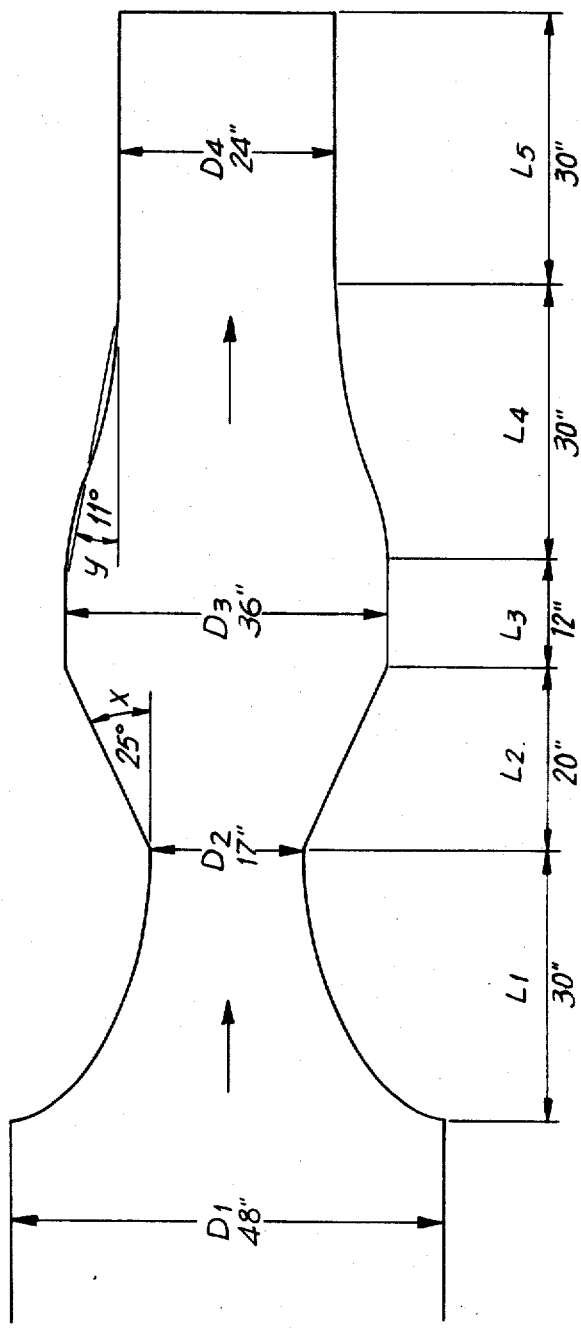
FIG. 2 also shows section contours, similar to those shown in FIG. 1, of dies embraced within the invention.

The internal configuration of the die shown in cross-section in FIG. 1 is repeated schematically in FIG. 2 so as to further and more completely illustrate dimensions and angles and curves being discussed, which are considered representative of the present invention.

The die of FIGS. 1 and 2 is employed in the production of a cylindrical graphite product with a diameter of 24 inches. The "mud cylinder" has a diameter of 48 inches (diameter $D_1$). In passing through section A, which possesses a length $L_1$ of about 30 inches, the stock is gradually reduced to a diameter of about 17 inches ($D_2$). The cross-sectional area reduction ratio of this particular die, therefore, is about 8 to 1, which is approximately half the preferred maximum reduction ratio i. e. 15.0 to 1 employed in the first converging section. Diverging section B has an average angle of divergence of about 25° (angle X) with respect to the axis of the die, and the stock being extruded therethrough changes from a diameter of about 17 inches at its inlet to a maximum of about 36 inches ($D_3$) (a cross-sectional area expansion ratio of about 1 to 3.1), over its length $L_2$ of about 20 inches. (Angle $x$ will generally be between about 15° and about 45°.) The maximum diameter of 36 inches is maintained for a distance $L_3$ of about 12 inches in a section of substantially constant cross-section, e. g. a cylindrically shaped portion of member 5 (FIG. 1) at its exit end, before the stock passes into converging section C, wherein diameter $D_3$ is changed from 36 inches to about 24 inches ($D_4$), at an average reduction angle $y$ of 11° with respect to the axis of the die, over a linear distance $L_4$ of about 30 inches, after which the diameter of the stock remains constant for a distance $L_5$ of about 30 inches in member 7c. (The use of a section of substantially constant cross-section, e. g. cylindrical, after the second converging section is a preferred embodiment of the present invention.) Converging section C thus possesses a cross-sectional area reduction ratio of about 1.56 to 1, which approaches the minimum reduction ratio employed in the section. It will also be noted that in this particular die design or system the cross-sectional area reduction ratio in the first converging section is about seven times the cross-sectional area reduction ratio in the second converging section.

It will also be noted that the diameter ($D_2$) of the stock (17 inches) leaving the first converging section of this particular die is less than the diameter ($D_4$) of the stock (24 inches) leaving the second converging section. For reasons previously discussed, this is a preferred relationship in the dies of the present invention, i. e. the diameter of the stock leaving the second converging section being greater than (typically at least about 1.2 times as great) or least equal to the diameter of the stock leaving the first converging section.

Another die system embraced within the present invention, and one which is particularly advantageous for the production of large diameter stock without having to resort to larger mud cylinder and extrusion presses, is one wherein the maximum diameter of the stock in the diverging or bubble section (or exiting therefrom if the amount of divergence in the bubble section is sufficiently large) exceeds its diameter in the mud cylinder 1. For example, the die system may possess an inlet 60 inches in diameter and the diameter of the stock may be caused to change from 60 inches ($D_1$) to 41 inches ($D_2$) in converging section A (a cross-sectional area reduction ratio of about 2.1 to 1), to 67 inches ($D_3$) in diverging section B (a cross-sectional area expansion ratio of about 1.0 to 2.7), and finally to 45 inches ($D_4$) in converging section C (a cross-sectional area reduction ratio of about 2.2 to 1).

In such a die system, the average angle of convergence in section A is generally smaller than that of section A of FIGS. 1 and 2, unless length $L_1$ is greatly reduced. The diverging and converging angles $x$ and $y$ employed in sections B and C may be substantially identical to those of FIGS. 1 and 2, but these too will depend upon and be related to the dimensions $L_2$ and $L_4$ of the die in effecting the diameter changes indicated, i.e. from 41 inches to 67 inches and then to 45 inches.

In this embodiment of the invention it will also be noted that the degree of reduction in the second converging section C slightly exceeds the degree of reduction (or the reduction ratio in cross-sectional area) of that of the first converging section. A die of this particular configuration, although within the scope of the invention, would not be used in order to effect the type of needle-like particle orientation as previously described.

Other die systems and configurations may also be employed in carrying out the present invention and in achieving various objectives thereof. The foregoing described die systems, therefore, are not intended to be limitative but rather to be illustrative only of the die configurations and dimensions which may be used in the present invention.

For example, the die systems of the present invention can advantageously be used whenever it is desired to subject an extrudable material to a high degree of working. In most instances, however, the minimum cross-sectional area of the stock emerging from the second converging section will be at least six square inches. Extruded stock, e. g. carbonaceous, between about 90 and about 3,000 square inches in cross-sectional area is typical of the products produced in the present invention.

It should be noted that it is within the spirit of the present invention, and may sometimes be advantageous, to employ another die forming zone after the second converging section. Such a die forming zone would comprise first a diverging section and then a converging section, having similar characteristics as sections B and C previously described. These sections may also each be followed by a section of substantially constant cross-section.

Properties of graphitized products which have been extruded through dies ("Bubble") of the present invention compared to graphitized products or "controls" which have been conventionally extruded (i. e. using a "Standard" single converging section) are set forth in the following Table. In Examples 1 through 6, the carbon aggregate consisted of 45 parts of particles, ranging in Tyler screen size from through 3 mesh to just under 20 mesh, and 55 parts of flour milled to a fineness of 55percent through 200 mesh. In Examples 7 and 8 the carbon aggregate consisted of 45 parts of particles, ranging from one-half inch to just under 20 mesh Tyler screen size, and 55 parts of flour milled to the same fineness as in Examples 1 through 6. In each of the Examples 1 through 8, the carbon aggregate was mixed with the indicated number of parts of binder (coal tar pitch) having a softening point of about 110° C, and was extruded at the indicated pressure. (Other carbonizable binders which may be used in the present invention include various resins, tars, petroleum pitches and residues. Mixtures of binders may also be used.) The extruded products were then baked and graphitized (to about 2,600° C) under identical conditions conventional in the art.

It will be noted that in the Examples using needle coke, and dies of the present invention having smaller cross-sectional area reduction ratios in the second converging section than in the first converging section, i. e. the "bubble" dies of Examples 2, 4 and 6, the alignment of the particles was lessened so that the ratio of the transverse to the longitudinal average coefficient of thermal expansion (T/L ratio) of said stock, after baking and graphitizing, was reduced from that characteristic of axial alignment (viz. from that which resulted when a "standard" extrusion die was used as in Examples 1, 3 and 5).

In the case of Example 8, wherein a non-needle type of coke was used, and a die having a larger cross-sectional area reduction ratio in the second converging section than in the first converging section, the T/L ratio of the stock, after baking and graphitizing, was increased from that characteristic of axial alignment (Example 7). A die of these particular dimensions (D1-D2-D3-D4)(60-41-67-45) is thus not suitable for reducing the T/L ratio; however, like the bubble dies of Examples 2, 4 and 6, such a die may be used in the control of particle orientation; is suitable for subjecting an extrudable material to a high degree of working while being extruded; or is suita-

TABLE

| Example: | 1 | | 2 | | 3 | | 4 | | 5 | | 6 | | 7 | | 8 | |
|---|---|---|---|---|---|---|---|---|---|---|---|---|---|---|---|---|
| Die: | Standard | | Bubble | | Standard | | Bubble | | Standard | | Bubble | | Standard | | Bubble | |
| Dimensions of $D_1$–$D_2$–$D_3$–$D_4$, inches: | $D_1$ 48 | $D_2$ 24 | $D_1$ 48 | $D_2$ 17 | $D_1$ 48 | $D_2$ 24 | $D_1$ 48 | $D_2$ 14.6 | $D_1$ 40 | $D_2$ 20 | $D_1$ 40 | $D_2$ 12 | $D_1$ 60 | $D_2$ 45 | $D_1$ 60 | $D_2$ 41 |
| | | | $D_3$ 36 | | | | $D_3$ 30 | | | | $D_3$ 30 | | | | $D_3$ 67 | |
| | | | $D_4$ 24 | | | | $D_4$ 24 | | | | $D_4$ 20 | | | | $D_4$ 45 | |
| Cross-sectional area | $D_1/D_2$ 4 | | $D_1/D_2$ 8 | | $D_1/D_2$ 4 | | $D_1/D_2$ 10.8 | | $D_1/D_2$ 4 | | $D_1/D_2$ 11.1 | | $D_1/D_2$ 1.8 | | $D_1/D_2$ 2.1 | |
| Reduction ratio | | | $D_4/D_4$ 2.25 | | | | $D_3/D_4$ 1.56 | | | | $D_2/D_4$ 2.25 | | | | $D_2/D_4$ 2.2 | |
| Type coke, needle | A | | A | | B | | B | | C | | C | | 1 D | | 1 D | |
| Binder level (pts./100 pts. coke) | 25.6 | | 25.6 | | 26.2 | | 26.2 | | 27.4 | | 27.4 | | 22.7 | | 22.7 | |
| Extrusion pressure (p.s.i.) | 1,600 | | 2,400 | | 1,200 | | 1,400 | | 1,600 | | 2,000 | | 100 | | 350 | |
| Properties of graphite: | | | | | | | | | | | | | | | | |
| Apparent density (g./mL) | 1.61 | | 1.63 | | 1.61 | | 1.61 | | 1.57 | | 1.59 | | 1.67 | | 1.67 | |
| Electrical resistivity (lengthwise) (ohm-in.×10⁶) | 27 | | 28 | | 31 | | 34 | | 31 | | 31 | | 38 | | 38 | |
| CTE,°C.⁻¹ (20–100° C.): | | | | | | | | | | | | | | | | |
| L×10⁷ | 3.0 | | 5.0 | | 4.1 | | 8.7 | | 7.1 | | 8.5 | | 18.2 | | 16 | |
| T×10⁷ | 18.1 | | 16.0 | | 16.4 | | 14.5 | | 17.7 | | 16.0 | | 21.7 | | 23 | |
| Ratio T/L | 6.0 | | 3.2 | | 4.0 | | 1.7 | | 2.5 | | 1.9 | | 1.2 | | 1.4 | |
| Flexural strength (p.s.i.) | 870 | | 860 | | 1,060 | | 975 | | 990 | | 800 | | 830 | | 950 | |
| Number of samples | 8 | | 10 | | 18 | | 12 | | 9 | | 7 | | 32 | | 25 | |

¹ Non-needle.

ble for "improving the structure of carbonaceous stock" in that such a die makes possible the exertion of more extrusion pressure upon the carbonaceous mix being extruded than when using a standard or conventional die, and also typically results in product of higher flexural strength and lower electrical resistivity than a "standard" stock product. Such a die is also embraced within the present invention because it possesses the three converging, diverging and converging sections in proper sequence as well as several other die features as previously discussed.

The die system of this invention is operated in much the same manner as that employed by those skilled in the art in extruding through conventional dies. As previously pointed out, however, caution must be observed to adjust conditions so that the material in the system flows smoothly and does not shot-gun or rifle through the bubble section. Extra care must also be observed in closely controlling those operating variables that affect the rheological characteristics of the mix in order to assure an axially symmetrical pattern of flow through the system as successive batches are charged to the system. A multiplicity of separately controlled heating coils may be employed to surround the various sections of the die to assist in this control.

The mix is charged to the mud chamber of the press and is consolidated by advancing the ram until the die system is filled. (To start with it is necessary to block off the exit end in order to completely fill the bubble portion of the die system.) Once the die is filled the extrusion can be conducted in the usual manner.

As previously indicated, when using a mix composed of needle-like particles and a coal tar pitch binder, and dies with design features as previously described, the particles tend to be oriented in the mud chamber of the press with their long axes perpendicular to the axis of the cylinder or direction of motion. As the mix progresses through the converging die, the needle-like particles become aligned with their long axes mutually parallel and parallel with the axis of the die. Then as the mix progresses into the diverging portion of the bubble section, the needle-like particles tend to become realigned with their axes more or less perpendicular to the axis of the die system. Finally, as the mix progresses through the final converging section, the desired angle of inclination of the needle-like particle axes with respect to the die axis is achieved as defined by the degree of reduction imposed.

Essentially then, one of the main purposes of many of the dies embraced within the present invention is to permit the control of grain orientation during extrusion as a means of controlling the coefficient of thermal expansion (CTE) characteristics in the final graphite product. It should be emphasized that the level or magnitude of the electrode CTE will be dependent upon the CTE characteristics of the raw material, and that the ratio of the transverse to the longitudinal CTE will be dependent not only on the raw material but also on the specific dimensions of the various sections of the bubble die system.

Obviously, the properties of the final product can be varied almost infinitely by proper choice of raw materials and die dimensioning. Where essentially spherical (rather than needle-like) particles are involved the resultant product is essentially isotropic, or more nearly so, but superior to a conventionally extruded product because of the greater working the mix has experienced.

It should also be appreciated that dies within the scope of the present invention can also be used for achieving the production of larger cross-sectional area stock than that of any particularly sized mud cylinder that might be on hand and that for such purposes the dies can also be used with or without non-needle-like particle mixes.

ADVANTAGES SUMMARIZED

The process and apparatus of this invention have several advantages including the following:

1. They provide means for controlling grain orientation, hence product properties, while at the same time permitting the use of pressures higher than those possible through conventional extrusion;
2. They enable the working of the mix more than in conventional extrusions thereby providing a more highly consolidated product;
3. They eliminate or minimize the problems associated with batch separations in extruding in a conventional manner to achieve the same grain orientation; and
4. They permit improved efficiency in operations because of the use of larger batches.

I claim:

1. A method for improving the structure of carbonaceous stock by means of an extrusion operation wherein the mix employed in making the stock is subjected to a high degree of working while being extruded which comprises forcing, by means of a conventional hydraulically or mechanically actuated ram press, the mix, which contains a preponderance of coke or graphite particles or mixtures thereof and a carbonizable binder, through a forming die which is free from any obstructions and which possesses at least three sections defined by the walls of the die comprising a first converging section, then a gradually diverging section possessing no abrupt contour changes, and then a second converging section, the structural integrity of said coke or graphite particles being maintained substantially unchanged during the extrusion operation.

2. A method according to claim 1 wherein the sections of said forming die are coaxially aligned.

3. A method according to claim 1 wherein the minimum cross-sectional area of the stock emerging from the second converging section is at least 6 square inches.

4. A method according to claim 1 wherein the reduction ratios of the cross-sectional areas in each of the converging sections is between about 1.25 to 1 and about 15.0 to 1 and wherein the expansion ratio of the cross-sectional areas in the diverging section is between about 1 to 1.25 and about 1 to 15.

5. A method according to claim 1 wherein the average angle of divergence in the diverging section is between about 15° and about 45° with respect to the axis of the die.

6. A method according to claim 1 wherein after being forced through the diverging section, the mix is next forced through a section of substantially constant cross-section before being forced through the second converging section.

7. A method according to claim 1 wherein the cross-sectional area of the stock leaving the first converging section is equal to or less than the cross-sectional area of the stock leaving the second converging section.

8. A method according to claim 1 wherein the mix is forced through a section of substantially constant cross-section after being forced through the second converging section.

9. A method according to claim 4 wherein the cross-section of the mix being extruded at any location in each of the sections is circular.

10. A method according to claim 8 wherein after being forced through said section of substantially constant cross-section, the mix is then forced through another die forming zone comprising first a diverging section and then a converging section.

11. A method according to claim 10 wherein said diverging section and said converging section are each followed by a section of substantially constant cross-section.

12. A method for controlling the thermal expansion properties and improving the structure of carbonaceous stock comprising the step of forcing by means of a conventional hydraulically or mechanically actuated ram press a carbonaceous mix containing a preponderance of needle-like coke particles or needle like graphite particles or mixtures thereof and a carbonizable binder through a forming die which is free from any obstructions and which possesses at least three sections defined by the walls of the die comprising a first converging section, then a gradually diverging section possessing no abrupt contour changes, and then a second converging section, the reduction ratio of the cross-sectional areas of the stock entering and leaving the second converging section being less than the reduction ratio in the first converging section, whereby the alignment of said particles is lessened to such an extent that the ratio of the transverse to the longitudinal average coefficient of thermal expansion of said stock, after baking and graphitizing, is reduced from that characteristic of axial alignment, the structural integrity of said needle-like coke or graphite particles also being maintained substantially unchanged during the extrusion operation.

13. A method according to claim 12 wherein the sections of said forming die are coaxially aligned.

14. A method according to claim 12 wherein the cross-sectional area reduction ratio in the first verging section is between about 1.25 and about 12 times as great as the cross-sectional area reduction ratio in the second converging section.

15. An apparatus for subjecting an extrudable mass containing a preponderance of particulate material to a high degree of working while being extruded, comprising a cylindrical chamber into which the material to be extruded is charged, a conventional hydraulically or mechanically actuated ram press for forcing the extrudable mass through the apparatus, and a forming die leading from the outlet of the cylindrical chamber, said forming die being characterized by being free from any obstructions and by possessing at least three sections defined by the walls of the die comprising a first converging section, then a gradually diverging section possessing no abrupt contour changes, and the second converging section, the reduction ratios of the cross-sectional areas in each of the converging sections being between about 1.25 to 1 and about 15 to 1, and the expansion ratio of the cross-sectional areas in the diverging section being between about 1 to 1.25 and about 1 to 15.

16. An apparatus according to claim 15 wherein the sections of said forming die are coaxially aligned.

17. An apparatus according to claim 15 wherein the cross-sectional area reduction ratio in the second converging section of the forming die is less than the cross-sectional area reduction ratio in the first converging section.

18. An apparatus according to claim 16 wherein said coaxially aligned sections are each also characterized by possessing smooth interior contours and wherein a cross-section at any location in each of the sections is circular.

19. An apparatus according to claim 17 wherein the cross-sectional area reduction ratio in the first converging section of the forming die is between about 1.25 and about 12 times as great as the cross-sectional area reduction ratio in the second converging section.

* * * * *